(12) United States Patent
Crooks et al.

(10) Patent No.: US 12,002,028 B2
(45) Date of Patent: *Jun. 4, 2024

(54) ISOLATED POS TERMINAL CONNECTIVITY

(71) Applicant: NCR Voyix Corporation, Atlanta, GA (US)

(72) Inventors: John Crooks, Duluth, GA (US); John Tatum Dyal, Acworth, GA (US); Andrew Klenzak, Atlanta, GA (US); Brian Patrick Rogers, Roswell, GA (US); Sergio Silva, Atlanta, GA (US); Jeremy Cyle Taylor, Cumming, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,785

(22) Filed: Sep. 23, 2022

(65) Prior Publication Data
US 2023/0013242 A1 Jan. 19, 2023

Related U.S. Application Data

(63) Continuation of application No. 17/002,955, filed on Aug. 26, 2020, now Pat. No. 11,461,754.

(51) Int. Cl.
*G06Q 20/20* (2012.01)
*G06K 7/14* (2006.01)
(Continued)

(52) U.S. Cl.
CPC ......... *G06Q 20/202* (2013.01); *G06K 7/1413* (2013.01); *G06K 7/1417* (2013.01);
(Continued)

(58) Field of Classification Search
CPC ............... G06K 7/1413; G06K 7/1417; G06K 19/06018; G06K 19/06037; G07G 1/0009;
(Continued)

(56) References Cited

U.S. PATENT DOCUMENTS 9,084,005 B2 * 7/2015 Rosenberg ......... H04N 21/4405
11,200,569 B1 12/2021 James et al.
(Continued)

OTHER PUBLICATIONS

"U.S. Appl. No. 17/002,955, Non Final Office Action dated Feb. 28, 2022", 8 pgs.
(Continued)

*Primary Examiner* — Edwyn Labaze
(74) *Attorney, Agent, or Firm* — Schwegman Lundberg & Woessner, P.A.

(57) ABSTRACT

A system and method of providing two-way communication between an isolated POS system and a website are described. The POS system operates as an air gap system. In response to detecting a trigger event the two-way communication is initiated for installation, diagnostic and repair services. POS information for transmission to the website through the internet is generated using a QR code that includes the website address and a data payload that depends on the desired service. The QR code is read by a smart phone and transmitted to the website. The website responds by sending response data dependent on the QR code and desired service. The response data is communicated to the POS system via another QR code for further operations by the POS system based thereon.

20 Claims, 5 Drawing Sheets

(51) Int. Cl.
*G06K 19/06* (2006.01)
*G07G 1/00* (2006.01)
*G07G 1/01* (2006.01)
*G07G 1/12* (2006.01)
*H04B 5/72* (2024.01)
*H04L 9/40* (2022.01)

(52) U.S. Cl.
CPC . *G06K 19/06018* (2013.01); *G06K 19/06037* (2013.01); *G07G 1/0009* (2013.01); *G07G 1/0045* (2013.01); *G07G 1/01* (2013.01); *G07G 1/12* (2013.01); *H04L 63/0838* (2013.01); *H04B 5/72* (2024.01)

(58) Field of Classification Search
CPC .......... G07G 1/01; G07G 1/0045; G07G 1/12; H04L 63/0838
USPC ..................................... 705/21; 235/379, 375
See application file for complete search history.

(56) References Cited

U.S. PATENT DOCUMENTS

| | | | |
|---|---|---|---|
| 2005/0006468 A1* | 1/2005 | Fandel | G06Q 20/20 235/383 |
| 2013/0133086 A1* | 5/2013 | Liberman | H04L 9/3247 726/28 |
| 2014/0237484 A1* | 8/2014 | Dixon | G06F 9/546 719/313 |
| 2015/0089607 A1 | 3/2015 | Hubner et al. | |
| 2017/0076306 A1* | 3/2017 | Snider | G06Q 30/0205 |
| 2019/0386969 A1 | 12/2019 | Verzun et al. | |
| 2021/0266150 A1 | 8/2021 | Ornelas et al. | |
| 2021/0334341 A1* | 10/2021 | Roberts | G06F 21/105 |

OTHER PUBLICATIONS

"U.S. Appl. No. 17/002,955, Notice of Allowance dated Jun. 9, 2022", 7 pgs.
"U.S. Appl. No. 17/002,955, Response filed May 23, 2022 to Non Final Office Action dated Feb. 28, 2022", 12 pgs.

* cited by examiner

ISOLATED POS TERMINAL CONNECTIVITY

CROSS-REFERENCE TO RELATED APPLICATION

This application is a continuation of U.S. patent application Ser. No. 17/002,955, filed Aug. 26, 2020, which application and publication is incorporated herein by reference in its entirety.

BACKGROUND

The background description is for the purpose of generally presenting the context of the disclosure. Aspects of the description in this section that may not otherwise qualify as prior art at the time of filing is not admitted as prior art against the present disclosure. The information described in this section is thus provided to offer the skilled artisan a context for the following disclosed subject matter and should not be considered as admitted prior art.

The use of retail-related electronic devices, especially POS terminals and handheld scanners, in stores has increased dramatically over the last decade, both with the effort of businesses to cut costs by reducing headcount as well as the desire for individuals to interact less with retail store employees, the latter of which may be beneficial especially during times in which individual isolation becomes desirable for individual health. A POS terminal may be a member of a POS system containing multiple POS terminals. POS terminals may be deployed in a variety of high use locations, such as grocery stores, gas stations and the like, and thus may be used as checkout devices. Many of these checkout devices are stationary self-service terminals that may be managed by store personnel, and may include not only various electronics for providing checkout functionality, but also a scanner to read a bar code on an item presented at the scanner to provide the information to the electronics, as well as a display to provide information about the item being scanned. In some cases, however, the POS terminal may operate in an isolated environment in which communication (such as internet access) of the POS terminal to other devices outside the POS system and/or other POS terminals within the POS system is not permitted, e.g., for security purposes. However, it may be desirable in some circumstances to connect to the POS terminals to provide services.

SUMMARY

The present application describes in some embodiments.

In some embodiments, a point-of-sale (POS) system comprises: a display; and processing circuitry configured to: operate the POS system as an air gap system such that the POS system is incapable of direct internet access; and generate POS system information for transmission to, and receive response information in response to transmission from the POS system, a website through the internet using at least one of optical or near-field communication with a portable communication device for operations selected from among installation, diagnostic and repair services.

In some embodiments, the processing circuitry is further configured to: detect a trigger event of the POS system; and in response to detection of the trigger event, generate the POS system information for communication to the portable communication device.

In some embodiments, the processing circuitry is further configured to generate the POS system information through display of a one or multi-dimensional code on the display.

In some embodiments, the one or multi-dimensional code comprises an encoded web address for the portable communication device to open and metadata of the POS system for the portable communication device to transmit to the web address.

In some embodiments, the processing circuitry is further configured to receive the response information through a scan of another one or multi-dimensional code displayed on a display of the portable communication device.

In some embodiments, the processing circuitry is further configured to: detect locking up of the POS system during startup, generate the one or multi-dimensional code after detecting the locking up of the POS system for display to the portable communication device, the one or multi-dimensional code comprising: a web address of a website to which the portable communication device is to send the one or multi-dimensional code, the website to generate a temporary password and provide the temporary password to the portable communication device, and a data payload a password recovery query code used to initiate generation of the temporary password by the website, obtain from the portable communication device, as at least part of the response information, the temporary password, and restore a POS disk image in response to obtaining the temporary password.

In some embodiments, the processing circuitry is further configured to: generate a soft button in response to the POS system locking up during startup, detect activation of the soft button on the display of the POS system, and generate the one or multi-dimensional code in response to detecting activation of the soft button.

In some embodiments, the password recovery query code is configured to cause the website to prompt entry of a store identifier into the portable communication device for transmission to and verification by the website, after verification of which the temporary recovery password is calculated by the website.

In some embodiments, the processing circuitry is further configured to: detect calibration of a scale of the POS system, generate the one or multi-dimensional code for display to the portable communication device in response to detecting the calibration of the scale, the one or multi-dimensional code comprising: a web address of a website to which the portable communication device is to send the one or multi-dimensional code, the website to record the calibration and provide to the portable communication device a sealing code, and a data payload containing audit data and a serial number associated with the calibration, obtain from the portable communication device, as at least part of the response information, the sealing code, and electronically seal the scale using the sealing code.

In some embodiments, the one or multi-dimensional code is configured to cause the website to prompt entry of a store identifier and field engineer identifier into the portable communication device for transmission to the website, after which the sealing code is sent to the portable communication device by the website.

In some embodiments, the processing circuitry is further configured to: detect an error causing the POS system to not operate correctly, detect scanning of a predetermined diagnostic barcode as the one or multi-dimensional code after detecting the error, launch a diagnostic tool in response to scanning of the diagnostic barcode, determine, from the diagnostic tool, one or more error codes, at least one of the one or more error codes based on the error, generate the one or multi-dimensional code for display to the portable communication device, the one or multi-dimensional code comprising: a web address of a website to which the portable communication device is to send the one or multi-dimensional code, the website to provide one or more suggested fixes to the error, and a data payload containing the one or more error codes, and obtain from the portable communication device, as at least part of the response information, the at least one or more suggested fixes to the error.

In some embodiments, the processing circuitry is further configured to display an out-of-service message in response to detecting the error.

In some embodiments, the processing circuitry is further configured to: detect a reboot of the POS system, generate the one or multi-dimensional code for display to the portable communication device in response to detecting the reboot of the POS system, the one or multi-dimensional code comprising: a web address of a website to which the portable communication device is to send the one or multi-dimensional code, the website to record installation data, and a data payload containing a list of POS and peripheral model and serial numbers associated with the POS system, and obtain from the portable communication device, as at least part of the response information, a service contract number, location code, and customer-specific help desk phone number for storage in a memory of, and later display by, the POS system.

In some embodiments, the one or multi-dimensional code is configured to cause the website to prompt entry of a store address, lane number, and field engineer employee identifier for transmission to the website.

In some embodiments, the processing circuitry is further configured to: detect a problem with the POS system, determine that servicing the POS system is to occur due to the problem, display a message that contains instructions as to how to contact a help desk based on the customer-specific help desk phone number and how to identify a store location based on the location code, generate another one or multi-dimensional code for display to the portable communication device in response to determining that servicing the POS system is to occur, the other one or multi-dimensional code comprising: a web address of another website to which the portable communication device is to send the one or multi-dimensional code, the other website for requesting field service, and a data payload containing the response information obtained in response to the reboot, and trigger, based on response information from the other website provided by the portable communication device, platform software to determine diagnostics to undertake and results of the diagnostics to display on the display of the POS system for transmission to the other website via the portable communication device.

In some embodiments, a method of providing two-way communication between an isolated point-of-sale (POS) system and a website comprises: operating the POS system as an air gap system; detecting a trigger event to initiate the two-way communication for operations selected from among installation, diagnostic and repair services; generating encoded POS system information for transmission to the website through the internet; communicating the encoded POS system information to a portable communication device using at least one of optical or near-field communication; transmitting, at the portable communication device, the encoded POS system information to the website; receiving, at the portable communication device, response information in response to the POS system; and communicating at least some of the response information to the POS system for further operations by the POS system based thereon.

In some embodiments, the method includes encoding the POS system information as a quick response (QR) code.

In some embodiments, the method includes the QR code comprises a web address for the portable communication device to open and metadata of the POS system for the portable communication device to transmit to the web address.

In some embodiments, the method includes receiving the response information at the POS system through a scan of another QR code displayed by the portable communication device.

In some embodiments, at least one machine-readable medium including instructions that, when executed by processing circuitry, cause the processing circuitry to perform operations to implement of any of the above embodiments.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
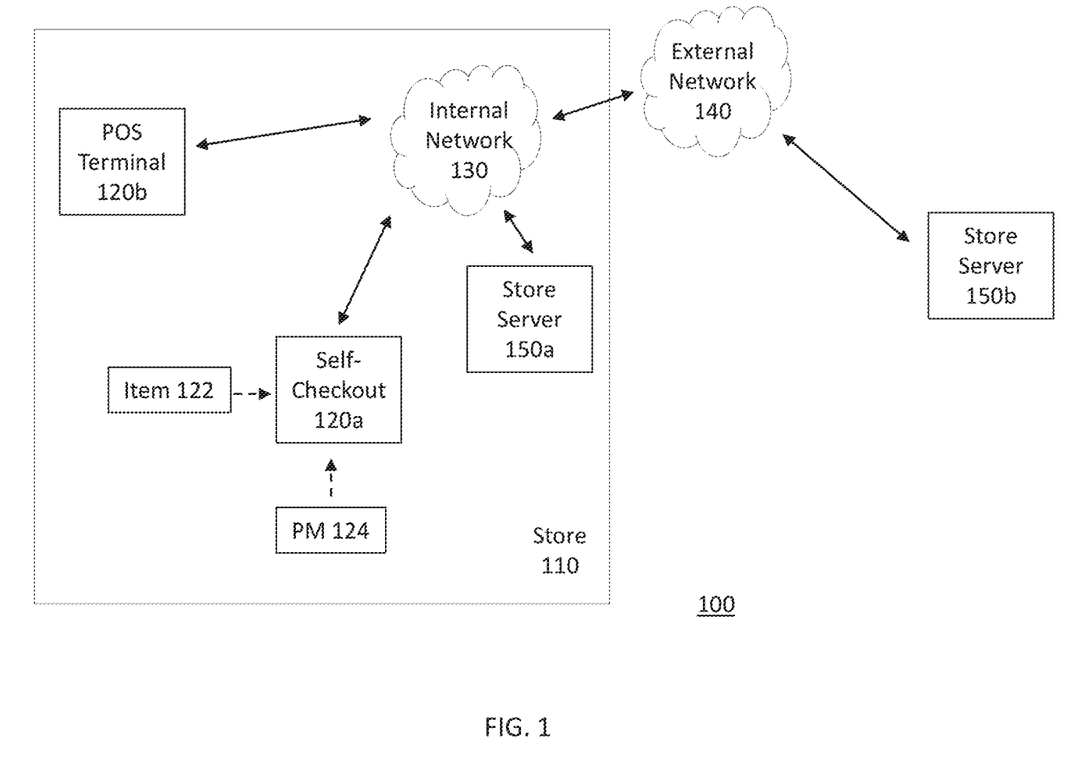
FIG. 1 illustrates one embodiment of a system according to one embodiment.
Figure 2A:
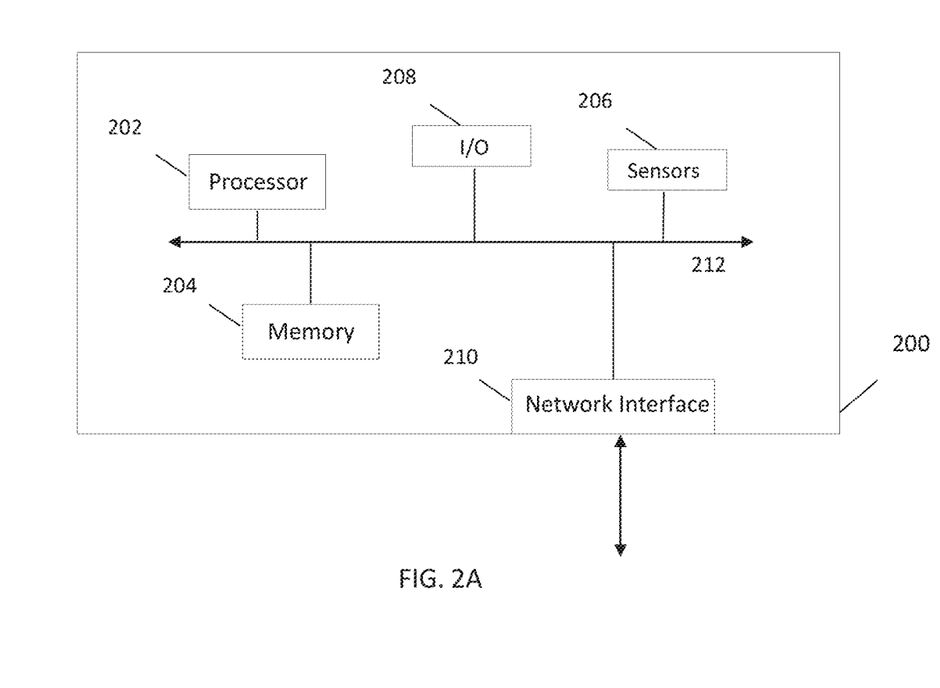
FIG. 2A illustrates a functional block diagram of a POS system in accordance with an embodiment.

FIG. 1 illustrates a system 100 that includes one or more individual POS systems, including one or more SCOs 120a and/or POS terminals 120b. The system 100 may include a store 110 in which the POS terminals are disposed. The store 110 may be a bricks-and-mortar type store, providing goods and/or services such as a supermarket or department/specialty store, or an enterprise such as a gas station. The POS systems may be configured to receive digital information, such as from a bar code of an item 122, and process the information in various ways, as described with reference to FIG. 2. The POS systems may also be configured to receive financial transaction information from payment mechanism (PM) such as a mobile device or a financial card, such as a credit, debit, or gift card. The electronic financial transaction may be contactless, such as via near field communication (NFC) or optical character recognition (OCR), or may use a card reader or other mechanism to read a financial card. The POS systems may thus obtain financial account-related information from an individual via one or more of a number of input mechanisms.

As above, POS systems may be independent (not in communication with a network entity via a wireless or wired connection) or may communicate with each other directly or via an internal network 130. The POS systems may match the item information (e.g., bar code) of an item 122 with pricing information. To match the information, the POS systems using data stored in a memory of the POS systems, or may communicate, e.g., via the internal network 130, with another entity (e.g., an in-store server) to obtain the data, which may then be displayed on a display of the POS system.

One or more of the POS systems may, in general, also communicate with other internal and external entities directly, via the internal network 130, or through an external network 140. The POS systems may communicate, for example, via one or more micro, pico or nano base stations (BSs). The POS systems may communicate with each other and external devices using any of a number of different techniques, such as WiFi, Bluetooth, Zigbee, or 3rd Generation Partnership Project (3GPP) network technologies, among others. In some cases, the POS systems may match the item information and pricing information with another entity—e.g., with an internal store server 150a via the internal network 130 and/or an external store server 150b via the external network 140. The POS systems may in addition capture financial information related to a transaction and attempt to confirm the information by transmitting the captured financial information to one or more servers via at least one of the internal network 130 and one or more external networks 140.

In various embodiments, the networks 130, 140 may be wired or wireless networks and one or more of the networks 130, 140 may not be present. Other equipment, such as base stations, routers, access points, gateways and the like used in communicating through the networks 130, 140 are not shown for convenience. The external network 140 may be, for example, the internet or a private network.

FIG. 2A illustrates a functional block diagram of a POS system in accordance with an embodiment. The POS system 200 may operate as a standalone device or may be connected (e.g., networked) to other computers. The POS system 200 may include a physical device and/or a virtual device, such as a server running one or more virtual network functions (VNFs) of the network shown in FIG. 1.

The POS system 200 may include various components connected by a bus 212. The POS system 200 may include a hardware processor 202 such as one or more central processing units (CPUs) or other processing circuitry able to provide any of the functionality described herein when running instructions. The processor 202 may be a multicore processor that is provided on a motherboard. That is, the processor 202 may have multiple cores (separate processing units), which may be identical or different. The cores may or may not share memory, and may or may not communicate. Each core may independently execute a separate set of instructions, although the instructions may be the same or may be different. Each core may thus be used to provide functionality that is the same as, or different from, another core. For example, one or more of the cores may be used to handle network communications, one or more of the cores may be used to handle graphics for the display 224, and one or more of the cores may be used to process images from the camera, among others.

The processor 202 may be connected to a memory 204 may include a non-transitory machine-readable medium on which is stored one or more sets of instructions. The memory 204 may include one or more of static or dynamic storage, or removable or non-removable storage, for example. A machine-readable medium may include any medium that is capable of storing, encoding, or carrying instructions for execution by the processor 202. Examples of a non-transitory machine-readable medium include solid-state memories, magnetic media, and optical media. Non-transitory machine-readable medium may include, for example, Electrically Programmable Read-Only Memory (EPROM), Random Access Memory (RAM), or flash memory.

The instructions may enable the POS system 200 to operate in any manner thus programmed, such as the functionality described specifically herein, when the processor 202 executes the instructions. The machine-readable medium may be stored as a single medium or in multiple media, in a centralized or distributed manner. In some embodiments, instructions may further be transmitted or received over a communications network via a network interface 210 utilizing any one of a number of transfer protocols (e.g., frame relay, internet protocol (IP), transmission control protocol (TCP), user datagram protocol (UDP), hypertext transfer protocol (HTTP), etc.).

The network interface 210 may in general enable the POS system 200 to communicate data and control information with other devices via wired or wireless communication. The network interface 210 may include electronic components such as a transceiver that enables serial or parallel communication. The wireless connections may use one or more protocols, including Institute of Electrical and Electronics Engineers (IEEE) Wi-Fi 802.11, Long Term Evolution (LTE), 4G, 4G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which the communication device 200 may be connected via the network interface 210 may include a local area network (LAN), a wide area network (WAN), a packet data network (e.g., the Internet), mobile telephone networks (e.g., cellular networks), and wireless data networks. The POS system 200 may be connected to the networks via one or more wired connectors, such as a universal serial bus (USB), and/or one or more wireless connections, and physical jacks (e.g., Ethernet, coaxial, or phone jacks) or antennas. In some embodiments, however, at least some of these abilities (of the network interface 210 and/or other communication circuitry) may be deliberately eliminated or disabled, as described below.

The POS system 200 may further include one or more sensors 206, such as one or more of an accelerometer, a gyroscope, a global positioning system (GPS) sensor, a thermometer, a proximity sensor, and an ambient light sensor, among others. The sensors 206 may include some, all, or none of one or more of the types of sensors above (although other types of sensors may also be present), as well as one or more sensors of each type.

The POS system 200 may further include one or more input/output (I/O) devices 208. The I/O devices 208 may include one or more of a display, a camera, an alphanumeric input device 212 (e.g., a keyboard), a keyboard, a microphone, a mouse (or other navigation device), a weight sensor, or a fingerprint scanner, among others. The I/O devices 208 may include some, all, or none of one or more of the types of I/O devices above (although other types of I/O devices may also be present), as well as one or more I/O devices of each type.

Figure 2B:
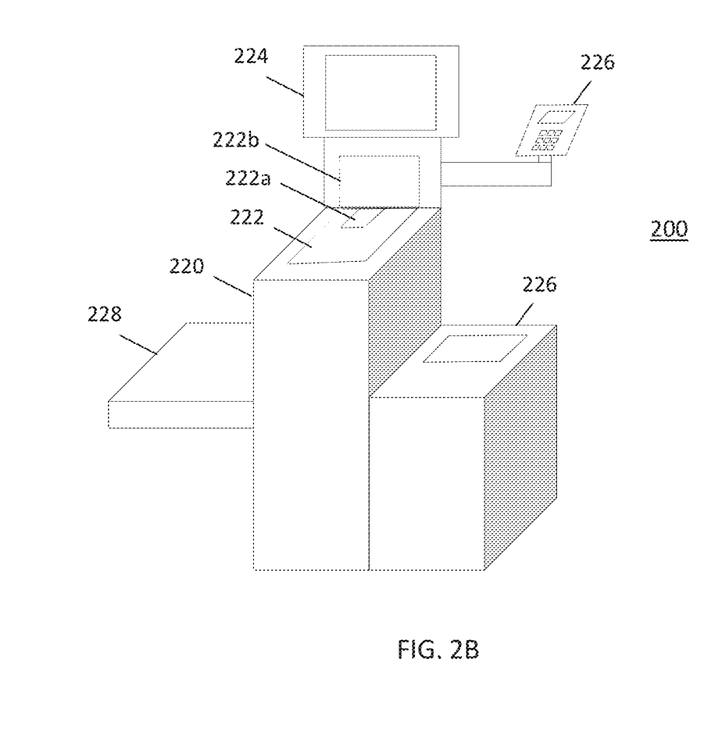
FIG. 2B illustrates physical aspects of the POS system of FIG. 2A in accordance with an embodiment.

FIG. 2B illustrates physical aspects of the POS system 200 of FIG. 2A in accordance with an embodiment. The POS system 200 may, in general, have a flatbed scanner POS and an operator display, in which the scanner POS integrates a standalone bioptic scanner and electronics. The POS system 200 may include a main section 220, a secondary section 226, and a tertiary portion 228 to retain a group of items thereon. The main section 220 may include a scanner 222 having two (glass) windows 222a, 222b that is insertable into (i.e., removable or separable from) a chassis of the main section 220. The main section 220 may also include a display 224 and pinpad 226 connected with the display 224. The main section 220 may also have a bin in which cash is retained, as well as a reception area to receive cash (bills and change) from a user, and a dispenser to dispense change (bills and change) to the user. The processor may be disposed in the main section 220 and may handle all aspects of processing by the POS system 200, including those related to item scanning (detection and identification of an item), internal communication with various components of the main section 220 and external communication with other elements (e.g., the internal or external store server) external to the main section 220, controlling the display 224, and controlling communications of the pinpad 226, among others.

The scanner 222 may contain a motherboard on which one or more processors is mounted. An item may be scanned using the scanner 222 by placing the item within the vicinity of one of the windows 222a, 222b. One or more lasers (or other illumination source) contained within the main section 220 may be used to illuminate a one-dimensional predetermined symbol, such as a bar code, or a two-dimensional predetermined symbol, such as a quick response (QR) code or data matrix. The image may be detected by optical sensors contained within one or more cameras in the main section 220. The cameras may be embedded in the scanner 222 and/or can be disposed at outside of the scanner 222, at a maximum distance of about 12 feet for accurate capture and timing for processing of the image captured. In some embodiments, each camera may be associated with a different illumination source.

The laser and/or camera field of view may be directed by one or more mirrors within the main section 220 to permit scanning of the item at various orientations through any of the windows 222a, 222b. That is, an image of the predetermined signal may be captured using the mirrors to direct the image so that it impinges on optical sensors in the main section 220.

Each camera may provide an image at a rate of about 30 frames per second (fps). Thus, in embodiments in which 3 cameras are used to provide images, the total frame rate may be about 90 fps. Such a rate is fast enough to allow sufficient time for processing each image to determine whether an item is present, as well processing the symbol if present, while not unduly limiting manual/physical processing of the item and stalling. The processor in the main section 220 may determine whether a symbol is present in an image by, for example, matching at least a portion of a symbol captured by one or more of the cameras to that stored in memory.

Having determined that the desired symbol is present, the processor may then determine information of the symbol. The processor may determine from one or more areas of interest within the symbol (e.g., lines of the bar code, two-dimensional areas within the entire area of the QR code) a number and/or size of objects within each area, and/or distance between each object. The information of the symbol may be matched by the processor in a lookup table in a memory within the main section 220 to determine the item scanned. Another lookup table may be used to match the item with store-related specifics of the item, such as price, to supply to the display 224. The processor may also keep track of the total cost of all items scanned, which may also be provided to the display 224 via the processor. Alternatively, or in addition, the processor may communicate with the internal store server and/or external store server to obtain the store-related specifics of the item if such communication is permitted. The internal store server and/or external store server may also contain other information about the item that may be unused by (and thus not transmitted to) the POS system 200, such as quantity available/remaining in the store, and wholesale cost to the store, among others.

The display 224 may provide a display only (i.e., output only) or may be an I/O device (e.g., a touchscreen), whose user input is provided to the processor for processing. The selectable (visible) information (e.g., icons) on the display 224 may include, for example, payment options, ability to cancel an item or order, ability to provide of a code for an item (e.g., a bulk item without a symbol being weighed using a scale attached to the scanner 220 disposed within the main section 220), ability to select payment options, etc. . . . . The input from the display 224 provided by the user may be, for example, selection of payment options, cancellation of an item/order, manual entry of a bulk item code, among others. In either case, the display 224 may be entirely under the control of the processor rather than a motherboard in the display 224 controlling the display 224 and various components of the POS system 200 other than the scanner 220. In some cases, however, the display 224 may have minimal processing power that is limited to enabling display of the desired information indicated by the processor (e.g., a video card) or even may not have its own processor. The processor may also control communications with the pinpad 226 for taking payment for purchase of the items.

The secondary section 226 may include a scale or other weight sensor to determine whether an item scanned using the scanner 222 has been placed on the secondary section 226 (e.g., on the secondary section 226 within a bag adjacent to the secondary section 226). The scale in the secondary section 226 may be connected to the processor in the main section 220, for example, to determine whether the weight of the item placed on the secondary section 226 matches that determined when scanned by the main section 220. In various embodiments, the scanner 222 and scale may be separate or may be combined.

Figure 2C:
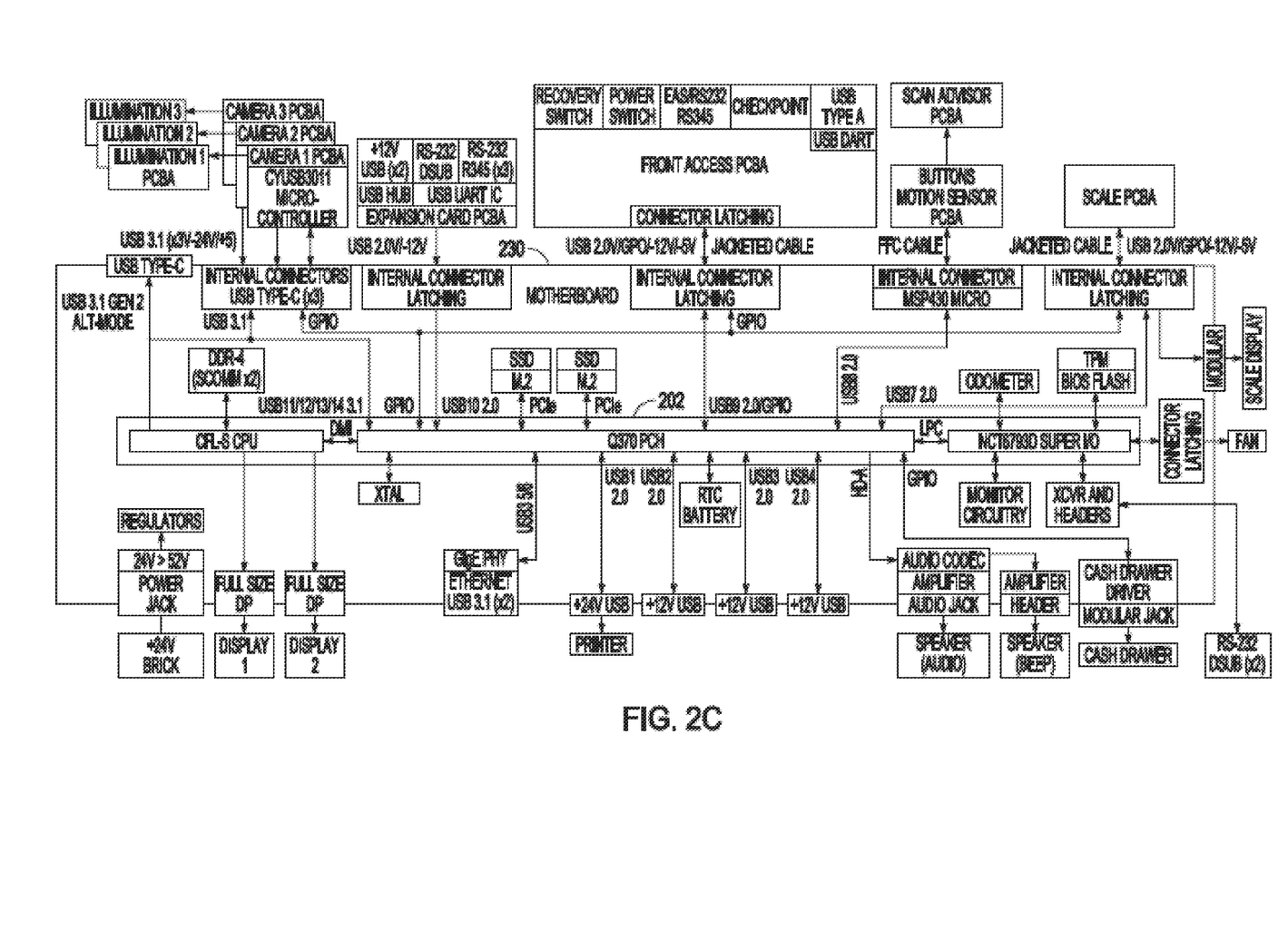
FIG. 2C illustrates a motherboard of a POS system in accordance with an embodiment.

As indicated above, the processor and other components used to operate the various components of the POS system 200 may be integrated on a single motherboard within the scanner 222. FIG. 2C illustrates a motherboard 230 in accordance with an embodiment. Such an embodiment avoids complicated implementations in which a processor is contained in both the display 224 and the scanner 222, with the processor in the display 224 being a master processor and the processor 202 in the scanner 222 being a slave processor. The display 224 may thus be a dummy terminal, in which other than no processing is provided—other than perhaps a processor on a graphics card to provide processing for graphics on the display 224. Alternatively, the display 224 may act like a dummy terminal, having a processor able to control other aspects of the POS system 200 (i.e., more than merely the display 224—such as control of the scanner 220), but one that is not configured to operate to control these other aspects. The use of a single motherboard (containing a multicore processor) may, however, combine all self-checkout operations, permitting easy upgrade of the processing capabilities by replacement of a single element—the scanner 222, in addition to elimination of the use of a separate processor in the display 224, thereby reducing the overall cost of the POS system 200 by reducing the cost and complexity of the display 224 as well as the logistics for servicing the POS system 200 by reducing the number of parts (which may be retained in different physical locations).

The processor 202 on the motherboard 230 may operate on a selected hardware platform, such as X86 or advance RISC machine (ARM) and may be software agnostic, depending on the desired hardware platform. For example, the processor may operate using a proprietary operating system, such as Windows, or an (at least partially) open source operating system such as Linux or Android. The camera interface may be selected from a Mobile Industry Processor Interface (MIPI) or universal serial bus (USB), among others. The motherboard may multiple connectors of various types to connect to individual external components, which may include multiple printed circuit board arrays (PCBAs) of the POS system 200. For example, the connectors at the back of the scanner may include one or more of each of: ethernet ports, RS232 ports, display (e.g., VGA) ports, 5V USB 3.1, USB type-C, 12V USB power, USBC and/or 24V USB power ports, in addition to a port for a scale display, power, speaker output, and a Cash Drawer Kick Out (CDKO) port. These ports may be used to connect the motherboard to the cameras, an expansion card PBCA that contains a USB hub and RS-232 connectors, a motion sensor (which may be connected to a scan advisor PCBA operating the scanner), a scale, a printer, one or more displays, one or more speakers, and a cash drawer. The motherboard may use latching to the PCBAs to synchronize communications between the external components, and perhaps provide clock signals and/or power to these components. The USBC Superspeed may be used for communication with the cameras, and for a high-speed data link, as operation of the cameras may be in the near megabit range due to the timing aspects from image capture to item identification and display to maintain a reliable checkout pace in the checkout line (e.g., pace set by a cashier using the POS system 200). In some embodiments, the image recognition and item identification may be limited to no more than about 40 ms to enable adequate advancement of items when being scanned at a checkout counter. When this value exceeds 40 ms, it may be unable to maintain an acceptable checkout speed. This, in turn, may limit the frame rate of the cameras, as well as distance of the cameras from the processor and motherboard in the scanner.

The Basic Input/Output System (BIOS) instructions used by the processor may configure the USBS ports for improved camera latency over standard OS control. The processor may also be used to control power to the USB3 cameras 5V/24V. The processor 202 may include a multi-core processor connected with a Platform Controller Hub (PCH) via a Direct Media Interface (DMI), which is connected with an I/O interface via a Low Pin Count (LPC) bus.

Each camera may contain a direct memory access (DMA) controller, which communicate with the motherboard 230 through the USB type C connector. The illumination used to detect the symbol on the item on the scanner may be powered through the USB type C connector and controlled by the DMA controller. The processor 202 may sync all signals to the cameras using a control switch in multiples switch banks on the motherboard 230, each switch bank dedicated to a different camera. The control switches may be control synchronously to link the cameras together when activated. Each control switch may be provided from a general-purpose input/output (GPIO) of the processor 202. Each switch bank may also have a switch used to supply 5V or a 24V for power to the associated camera.

The use of the processor 202 on the motherboard 230 may permit reliable interactions among the components of the POS system 200 by centralizing load balancing among the components. That is, the resources used for image capture and recognition, electronic communication, item and price identification, display, printing and CDKO, among others, may be balanced by the processor 202 without locking up the entire system. To this extent, in some embodiments, the processor 202 may include a main processor whose cores may operate, in addition to the OS and driver software to drive the various components, a POS application, a universal POS (UPOS) or JAVA POS scanning software, and code decoding software to decode the code (e.g., barcode, QR code) on the symbol once the symbol is detected. A multi-core graphics processor may be used to operate code region finder software to determine where the symbol is located on the item.

As indicated above, some POS systems may be able to be in (constant) communication with other POS systems or entities through an internal and/or external network, while other POS systems may be isolated/"air gapped" to provide an additional layer of security for the POS system. That is, while perhaps having the capability to be connected to other communication entities, the air gapped POS system may be isolated. This isolation may permit interactions of the POS system using optical information (obtained via the scanner), short-range communications (e.g., NFC communications or other communications within a range of a few inches), and/or to an air gapped store network that is incapable of providing direct internet access (through communication circuitry to communicate via a long-range protocol such as LTE, 4G or 5G). The communication circuitry may not be present or may be temporarily or permanently disabled, e.g., during installation at a store. In some embodiments, the processing circuitry in the air gapped POS system may be triggered to temporarily enable communication with other entities (e.g., servers) via the internet to provide specific services, such as diagnostic and repair services, using an alternative mechanism. The POS system may be a legacy POS system that includes a POS terminal, touch screen display, and conventional barcode scanner/scale or a Scan-POS system that includes, for example, an NCR 7840 ScanPOS and touch screen display. In other embodiments, the scanner may include or be a webcam.

Figure 3:
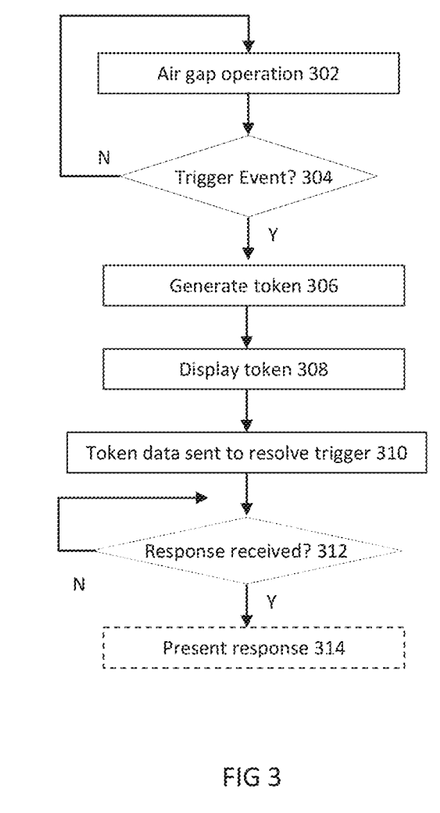
FIG. 3 illustrates a flowchart of a method of providing network access to a POS system in accordance with some embodiments.

FIG. 3 illustrates a flowchart of a method of providing network access to a POS system in accordance with some embodiments. Although some operations are shown, the embodiment illustrated is not meant to be exclusive; additional operations are contemplated, such as communication with various entities internal and/or external to the POS system.

At operation 302, the POS system may operate as an air-gapped POS system and thus be unable to communicate with network entities other than those within the local store in which the POS system is installed; that is the POS system may be unable to communicate via the internet. The inability to communicate via the internet may be due to the POS system lacking the components for communication or the communication components may be deactivated. For example, if the POS system is installed in a grocery store, the POS system may be used to scan items to be purchased by a consumer at the POS system, provide a running total cost for the items to be purchased by the consumer, accept a payment for the items to be purchased by a consumer, etc..... The POS system may include, for example, a SCO or an assisted checkout terminal.

At operation 304, the POS system may determine whether a trigger event has occurred. If not, the POS system may return to operation 302 and continue to operate as an air-gapped POS terminal. If so, the POS terminal may proceed to operation 306, in which the POS system may initiate air gap communication. The trigger event may be associated with servicing of the POS terminal or an error associated with operation of the POS system. For example, the trigger event may be an error of the POS terminal or ScanPOS scanner for which support or servicing is to be involved or calibration of the scale (e.g., by a field engineer). In another example, the trigger event may be activation of an input (e.g., button) by a local user or scanning of a paper-printed diagnostic barcode by the scanner of the POS system.

To initiate air gap communication, at operation 306, the POS system may generate a query token containing an internet web address and data payload-related to the trigger event. That is, the processing circuitry of the POS system may retrieve from a memory information that is dependent on the trigger event and in response generate the query token. The query token may be a single or multi-dimensional token such as, for example, a one-dimensional (bar code) or two-dimensional (QR code) token. For example, the display of the POS system may show a Hypertext Markup Language (HTML) QR code encoded with a web address and related metadata.

The web address may be a website Uniform Resource Locator (URL). The data payload may be a query string attached to the URL. The processing circuitry of the POS system may encode the URL and query string into the HTML QR code using known standards for display. In other embodiments, the query token may be a QR code having a location address and other data encoded according to industry standard rules for communication by a device scanning the QR code. The location address may include one or more of, for example, a phone number, short messaging service (SMS) address, or email address.

The query token may be a wireless communication in addition to or instead of an optical token; for example, an NFC message (e.g., Android Beam NFC message) containing similar information as the QR code (e.g., URL address and query string). In some embodiments, a combination of optical and wireless communication may be used to provide the desired information (location address and data payload), in which case, each communication may contain the same information, partially overlapping information, or entirely separate information to be used to effect the same response.

In some embodiments, examples of the data payload format include a sequence of touch tone key presses sent after dialing a phone number, an SMS message, and/or an email message. Similarly, examples of the data payload include a serial number of the POS terminal or ScanPOS terminal, a barcode scanner configuration, a customer service contract number, and encrypted data used to issue a one-time Imaging Suite recovery password. Other examples of the data payload include POS terminal information such as error codes or diagnostic results, a serial number of the POS system (and/or one or more components of the system, for example including or only the component generating the error code), time/date of the trigger event, information of the last service (e.g., time/date/ID of the service personnel who last serviced the POS terminal), and information of a set number of previous service calls.

In one example, for an NCR 7840 ScanPOS, the scanner/scale platform software can generate the QR code and display the QR code in a window projected on top of and independent from the POS software. Due to ScanPOS architecture, customers install the ScanPOS scanner/scale platform software to ensure the built-in scanner/scale works. This ensures that the QR code capabilities are present.

At operation 308, a portable communication device may read the query token using a built-in camera, NFC reader, etc. The portable communication device may be, for example, a smart phone or tablet computer that is capable of both capturing and interpreting the query token and communicating with servers or other entities via the internet based on the query token. A downloaded or native application in the portable communication device may be used to interpret.

At operation 310, the portable communication device may communicate with servers or other entities via the internet based on the query token. The downloaded/native application may respond to the query token by automatically going to the encoded website or calling the encoded phone number, for example. The portable communication device may thus scan the QR code, subsequently, e.g., opening the web address with attached metadata on a web browser of the portable communication device and transmitting the data payload of the trigger event to the web address to resolve the trigger event. The query string from the HTML QR code may be provided to a server on the internet via the portable communication device rather than directly from the POS system. In some embodiments, to help resolve the trigger event, the website may also prompt the portable communication device to enter a personal phone number, SMS address, or email address for a customer service follow up or for sending a response token.

In some embodiments, shown at operation 312, two-way communication may be used in which a response is received by the portable communication device from the website. At operation 314 the portable communication device may display the response, which may be a proprietary code such as a QR code or other response token. The proprietary format (response) QR code displayed on the portable communication device may be provided to the scanner or webcam of the POS system. The POS system may interpret the response QR code and take one or more actions based on the response QR code to resolve the trigger event encoded inside. For example, the data in the response QR code may be one or more of a one-time password, a scanner configuration, etc. In other embodiments, the response token could also be a 1D barcode, NFC Android Beam message, etc. Scanning of the response QR code by the scanner or webcam of the POS system may thus trigger a diagnostic mode in the POS system or provide information for fixing the error.

SERVICE AND USE CASE EXAMPLES

Service: Imaging Suite Temporary Password

POS systems may support disk image recovery by pressing a dedicated image recovery button, which launches NCR Imaging Suite software. However, the Imaging Suite software may use a customer-specific password to finalize disk recovery, which local store users don't always know. The Imaging Suite software may also include a method to obtain a special one-time recovery password, which may entail local store users to call their designated help desk, which may be one of several available help desks. Local store users may furthermore be unaware of the phone number of their designated help desk.

As per the flowchart of FIG. 3, a trigger event may occur when the POS system encounters a problem, for example, when the POS system keeps locking up during startup. Based on similar past experiences, an attempt to restore the POS disk image may be made (e.g., by the local store manager) by pressing the POS recovery button, which launches the Imaging Suite software. The Imaging Suite software may request the image recovery password, which is unknown by the store manager. The store manager may in response activate a new soft button within the Imaging Suite software ("I have forgotten the password" button).

In response to activation of the soft button, the POS system may generate a query token. The Imaging Suite software may display an HTML QR code) containing the (ncr.com or other POS system manufacturer) web address of a temporary password website specifically set up for generating a password, and a data payload containing an Imaging Suite password recovery query code. The smart phone (or other portable device) may read the query token by scanning the QR code.

The smart phone may, in response, send the query token via the internet (e.g., using 4G or 5G protocols) to the temporary password website. The temporary password website may prompt entry of the store number into the smart phone for verification, and then calculate a temporary recovery password.

The smart phone may receive the temporary recovery password as a recovery QR code. The recovery QR code displayed on the smart phone may be scanned on the POS system, which may in response trigger the Imaging Suite software to apply the recovery image.

Service: Scale Calibration Record Keeping

Field engineers keep records of when retail store scale calibrations are performed to comply with local scale regulations. Legacy processes use paper forms, a process that can be automated and made more reliable. As per the flowchart of FIG. 3, a trigger event may occur when a field engineer/technician calibrates the scanner or scale of a POS system, such as an NCR ScanPOS 7840 scanner/scale. The POS system may generate a query token after successful calibration; that is, the scale platform software may display an HTML QR code. The QR code web address may be a (ncr.com) website for recording calibration data. The QR code data payload may be the scanner audit data (number of times calibrated; number of times sealed parameters have changed) and scanner serial number.

The smart phone may read query token when the HTML QR code is scanned. The website may prompt entry of the store address and the field engineer's employee ID (using the smart phone or via entry using the display of the POS system via another QR code and response), which may be transmitted by the smart phone to the website. In response, the website may record the calibration data and prompted information in a centralized database. The website may send a response QR code for the smart phone to display. The response QR code may contain an electronic scale calibration sealing code. The response QR code may be scanned on the scanner/scale, which electronically seals the scale.

The smart phone may thus be used to electronically transmit information to a server of the POS system manufacturer and/or official government server that would normally be filled out manually by the field engineer. Calibration and audit information sent may include a sealing code that contains a serial number of POS system serviced, time/date of service, technician providing service, and calibration data including number of times calibrated. Such an embodiment may thus avoid paperwork and provide a centralized repository for calibration data of different POS systems. The use of the portable communication device to transmit the calibration data may also eliminate the use of specialized equipment for calibration, including the use of a physical lead seal and wire combination used to seal the POS system (to avoid tampering of the calibration) and materials imprint on the lead seal to carry the audit information, as well as eliminating particular physical additions on the POS terminal used to retain the lead seal and wire.

Service: Provide Diagnostic Guidance

A field engineer may desire help diagnosing a failed POS system in a live store. As per the flowchart of FIG. 3, a trigger event may occur when the POS system determines that an error has occurred and displays an out-of-service message. When a field engineer arrives the POS system, such as the ScanPOS 7840 system, displays the out-of-service message. The field engineer may scan a predetermined diagnostic QR barcode from a service guide (or a predetermined NFC communication), which signals the scanner platform software to launch an integrated ScanPOS diagnostic tool.

The POS system may generate query token using the ScanPOS diagnostic tool, which may scrape the POS software logs for the last five error codes and generate an HTML QR code accordingly. The QR code web address may be a (ncr.com) support website, and the QR code data payload is the last five error codes.

The smart phone may read query token when the field engineer scans the HTML QR code displayed using the display of the POS system using the smart phone. The smart phone may then send query token to the support website, which may analyze the last five error codes and provide one or more suggested fixes. The suggested fixes may be displayed on the smart phone or may be provided using a response QR code, which the POS system reads and then in response displays the suggested fixes on the display of the POS system. If the fixes are not useful, the website may offer a "Chat with a support analyst" button on the smart phone to open a chat session with a live Level 3 support analyst.

Service: Record Installation Data for Tracking Service Entitlement

In various embodiments, it may be desirable for field engineers to record POS system equipment model and serial numbers at the time of installation to track service entitlement and to know what service parts to bring. As per the flowchart of FIG. 3, a trigger event may occur when a field engineer installs a new POS system and reboots the system.

The POS system may generate a query token during startup. The POS platform software may briefly (e.g., 5-30 s) display a HTML QR code. The web address in the QR code may include a (ncr.com) website for recording installation data. The QR code data payload may include a list of POS and peripheral model and serial numbers. Existing platform software packages such as that used for assisted checkout terminals (RPDM) and SCO (CADD) may gather and log this information, but do not generate a QR code.

Similar to the above, the smart phone may read query token when the HTML QR code displayed using the display of the POS system is scanned using the smart phone. The smart phone may then send query token to the support website, which may prompt entry of the store address, lane number, and the field engineer's employee ID (using the smart phone or via entry using the display of the POS system via another QR code and response). Alternatively, this information may be stored in a memory of the smart phone prior to the smart phone scanning the QR code and automatically retrieved in response to scanning of the QR code or interaction with the support website. The website may record the installation data and prompted information in a centralized database.

The smart phone may receive the response token, which may then be applied to the POS system. In some embodiments, the support website may transmit a response QR code for display on the smart phone. The response QR code may contain the NCR service contract number, location code, and customer-specific help desk phone number. The smart phone may be scanned using the POS webcam or barcode scanner, and the platform software of the POS system may in response record the information displayed by the smart phone. In case of a future problem, for example a peripheral device stops communicating with the POS terminal, the POS platform software can display a message that instructs the store manager how to contact a particular help desk and how to identify their store location using the previously scanned information.

Service: Initiate Field Service

Store personnel sometimes do not know an assigned phone number for contacting a help desk, or how to provide technical details to receive optimal customer service. Similar to the above, per the flowchart of FIG. 3, a trigger event may occur when a POS system encounters a problem for which servicing of the POS system is to occur. One such example is a peripheral device stops communicating. In response to the problem, the POS system may generate a query token using information recorded within the POS terminal from the previous use case "Record Installation Data for Tracking Service Entitlement." The POS platform software may in turn display a message that instructs the store manager how to contact the appropriate help desk and how to identify the store location.

The message may further include an HTML QR code that allows the store manager to easily call for service. In some embodiments, the QR code web address may be a (ncr.com) website for requesting field service. The QR code data payload may include the (NCR) service contract number, location code (indicating the geographical store location), lane number (indicating the POS system within the store), and a list of POS system and peripheral model and serial numbers.

Similar to the above, the smart phone may read query token when the HTML QR code displayed using the display of the POS system is scanned using the smart phone. The smart phone may then send query token to the support website, which may prompt initiation of a chat session or phone call to investigate the problem and possibly dispatch a field engineer.

The smart phone may receive the response token, which may then be applied during the chat session or phone call (e.g., with the store manager). The support website may provide a response QR code with proprietary content to the smart phone. The response QR code displayed on the smart phone may be read by the POS scanner or webcam. Once read by the POS system, the response QR code may trigger the POS platform software to display further diagnostics and logs in the form of QR codes, which may then be scanned using the smart phone to send to the help desk for further interaction.

Accordingly, as the various examples above illustrate, the interactions between the air gapped POS system and the smart phone may enable two-way internet communication between the POS system and an automated service support website or other support mechanism for installation, diagnostic and repair services. As described above, the two-way internet communication may permit the POS system to obtain a temporary password for restoring POS disk images using Imaging Suite software, remotely record scale calibration records in a centralized location, provide online diagnostic guidance for store personnel and field service technicians in response to POS system problems, automatically record installation data in a centralized repository for tracking service entitlement and permit store personnel to initiate field service in a manner that automates and simplifies the operations.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The abstract will allow the reader to quickly ascertain the nature of the technical disclosure. The abstract is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects have more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. A method, comprising:
identifying, on a point of sale (POS) terminal, a trigger event associated with at least one of servicing or operation of the POS terminal, the trigger event associated with a group of errors that include a diagnostic error and a maintenance error;
generating, by the POS terminal, information relevant to the trigger event;
encoding, by the POS terminal, the information as encoded information;
providing, by the POS terminal, the encoded information to a mobile device;
receiving, by the POS terminal, response information from the mobile device; and
processing, by the POS terminal, the response information to at least partially resolve the trigger event on the terminal.

2. The method of claim 1, wherein encoding further includes encoding the information in a Quick Response (QR) code.

3. The method of claim 2, wherein providing further includes presenting the QR code on a display of the POS terminal for capture by a camera of the mobile device.

4. The method of claim 1, wherein encoding further includes encoding the information in a near field communication (NFC) message.

5. The method of claim 1, further comprising scraping POS software logs for a plurality of previous error codes immediately preceding a present error code associated with the trigger event, the information including the plurality of previous error codes and the present error code.

6. The method of claim 1, wherein receiving further includes scanning a Quick Response (QR) code from a display of the mobile device and decoding the QR code to obtain the response information.

7. The method of claim 1, wherein receiving further includes receive a near filed communication (NFC) message from the mobile device and obtaining the response information from the NFC message.

8. The method of claim 1, wherein identifying further includes determining that the POS terminal lacks Internet connectivity based on the trigger event.

9. The method of claim 8, wherein processing further includes establishing Internet connectivity after processing the response information received from the mobile device.

10. The method of claim 1, wherein generating further includes providing a web address to a web site as a portion of the information with a remaining portion of the information associated with an identifier for the POS terminal and the trigger event.

11. The method of claim 1, wherein processing further includes providing administrative access to the POS terminal based on a temporary password provided with the response information.

12. A method, comprising:
obtaining, by a mobile device, a message from a point of sale (POS) terminal that lacks direct Internet connectivity;
providing, by the mobile device, at least a portion of the message to a server after identifying the server from another portion of the message;
receiving, by the mobile device, response information from the server; and
providing, by the mobile device, the response information to the POS terminal to resolve a trigger event associated with the POS terminal, the trigger event associated with at least one of servicing or operation of the POS terminal, the trigger event associated with a group of errors that include a diagnostic error and a maintenance error.

13. The method of claim 12, wherein obtaining further includes scanning a Quick Response (QR) code presented on a display of the POS terminal for the trigger event, decoding the QR code and obtaining the message.

14. The method of claim 12, wherein obtaining further includes obtaining a near field communication (NFC) message from the POS terminal and identifying the message from the NFC message.

15. The method of claim 12, wherein providing the response information further includes, encoding the response information in a Quick Response (QR) code, and presenting the QR code on a display of the mobile device for scanning by the POS terminal.

16. The method of claim 12, wherein providing the response information further includes sending the response information to the terminal as a near-field communication (NFC) message.

17. The method of claim 12, wherein providing the response information to the terminal further includes causing the terminal to perform disk image recovery to resolve the trigger even based on the response information and providing a temporary password with the response information received from the server or a help desk.

18. The method of claim 12, wherein, further comprising scraping POS software logs for a plurality of previous error codes immediately preceding a present error code associated with the trigger event, the information including the plurality of previous error codes and the present error code.

19. A point of sale (POS) terminal, comprising:
a display; and
processing circuitry configured to perform operations, comprising:
detecting a trigger event causing an error condition on the POS terminal;
gathering diagnostic information associated with the error condition;
scraping POS software logs for a plurality of previous error codes immediately preceding a present error code associated with the trigger event;
generating a message that comprises a server address for a server, the diagnostic information for the error condition, and the plurality of previous error codes and the present error code;
creating an encoded message for the message;
providing the encoded message to a mobile device;
receiving response information from the mobile device, wherein the mobile device obtains the response information from the server using the server address in the encoded message; and
processing the response information to resolve the error condition.

20. The POS terminal of claim 19, wherein the trigger event is associated with a group of errors that include a diagnostic error and a maintenance error.

* * * * *